United States Patent [19]

Nadkarni

[11] 4,274,873

[45] Jun. 23, 1981

[54] DISPERSION STRENGTHENED METALS

[75] Inventor: Anil V. Nadkarni, Mentor, Ohio

[73] Assignee: SCM Corporation, New York, N.Y.

[21] Appl. No.: 28,554

[22] Filed: Apr. 9, 1979

[51] Int. Cl.³ .................................................. B22F 3/00
[52] U.S. Cl. ......................................... 75/211; 75/206; 75/213
[58] Field of Search .......................... 75/206, 211, 213

[56] References Cited

U.S. PATENT DOCUMENTS

| | | | |
|---|---|---|---|
| 3,709,667 | 1/1973 | Selman | 75/206 |
| 3,741,748 | 6/1973 | Fustukian | 75/206 |
| 3,776,704 | 12/1973 | Benjamin | 75/206 |
| 3,976,482 | 8/1976 | Larson | 75/211 |
| 4,141,727 | 2/1979 | Shida | 75/211 |

*Primary Examiner*—Brooks H. Hunt
*Attorney, Agent, or Firm*—Thomas M. Schmitz; Merton H. Douthitt

[57] ABSTRACT

A process for dispersion strengthening metal alloys comprising the steps of separating metal powder particles larger than about 180 microns, flattening the particles to provide flake particles having a thickness less than 180 microns, and then internally oxidizing the flake particles. The flaked particles can be combined and consolidated with atomized particles less than about 180 microns on a 20% to 80% and preferably 40% to 60% weight basis to provide improved dispersion strengthened metal products.

10 Claims, No Drawings

DISPERSION STRENGTHENED METALS

BACKGROUND OF THE INVENTION

This invention pertains to dispersion strengthened metals and particularly to an improved process for internally oxidizing metal alloys. Internal oxidation is a preferred method of dispersion strengthening and generally pertains to oxidizing a solid solution metal alloy. The alloy comprises a relatively noble matrix metal having a relatively low heat or free energy of oxide formation and a solute metal having a relatively high negative heat or free energy of oxide formation. During internal oxidation, the alloy is heated under oxidizing conditions to preferentially oxidize the solute metal to form a solute metal oxide which is known in the art as in situ internal oxidation or more simply "internal oxidation." Very desirable methods of internal oxidation are shown in commonly assigned U.S. Pat. No. 3,779,714 and U.S. Pat. No. 4,077,816 and the same are incorporated herein by reference.

Preferred methods for dispersion strengthening of metals ordinarily are dependant upon power metallurgy wherein the alloy powder should have particle sizes less than about 300 microns, and preferably less than about 200 microns, for efficient internal oxidation. Internal oxidation follows a parabolic rate law wherein the time required for complete internal oxidation is proportional to the square of the diffusion distance for oxygen. In practice, doubling or tripling the particle size increases the time interval for internal oxidation four to nine times. The most practical and efficient method for producing alloy powder is by atomization of molten metal such as described in U.S. Pat. No. 2,956,304 wherein a plurality of liquid streams (water) or nitrogen gas are sprayed from nozzles to impinge upon a centrally disposed molten metal. The high pressure streams intersect the molten metal simultaneously to provide spherical shaped atomized alloy metal particles. The atomization process, however, typically produces a size range of small particles wherein as much as 50% by weight of the particles are particles larger than about 200 microns. For efficiency reasons, only the fraction of smaller particles less than about 180 microns is screened and internally oxidized. The larger particles above about 180 microns are recycled into the molten metal and reatomized.

It now has been found that the oversize alloy particles above about 180 microns can be efficiently utilized for internal oxidation by subjecting the particles to a flaking process to provide alloy flakes having a thickness less than about 180 microns and preferably to flake thickness between about 100 and 125 microns. Flattening the large atomized particles to flakes provides internal oxidation time intervals comparable to small atomized particles smaller than 180 microns. A further advantage is achieved in that the flaking of the oversize atomized particles by impact or mechanical squeezing such as rolling apparently upsets and redistributes an outer surface oxide layer which often develops during the atomization process. Such surface enriched oxide layers tend to cause weak interfaces in finished dispersion strengthened products wherein failures tend to originate along the oxide layer under heavy load and elevated temperatures. Thus, flaking of oversize atomized particles has the additional advantage in that oxide surface areas are substantially reduced and thus provides a much stronger dispersion strengthened metal product. Still further, the alloy can now be atomized at larger particle size distribution thus eliminating undesirable fines which can be detrimental in some heavy duty applications such as use in welding electrodes. These and other advantages will become more apparent by referring to the Detailed Description of the Invention.

SUMMARY OF THE INVENTION

Briefly, alloy particles larger than about 180 microns are flattened or flaked by impact or mechanical working to provide flaked alloy particles having a thickness less than about 180 microns. The flaked alloy particles are combined with atomized alloy particles less than 180 microns, internally oxidized, and consolidated under heat to provide a high quality dispersion strengthened metal product.

DETAILED DESCRIPTION OF THE INVENTION

In practicing this invention, powdered alloy comprising a relatively noble metal matrix metal and a solute metal can be produced by conventional techniques such as melting the metal under inert gas or reducing conditions and thereafter forming metal alloy powder by water or gas atomization of molten metal or by other conventional size reduction techniques such as mechanical grinding. Preferably, the larger alloy particles larger than about 180 microns are separated by screening and then flaked or flattened in accordance with this invention prior to internal oxidation. The preferred powder alloy comprises a relatively noble matrix metal having a relatively low negative free energy of oxide formation at 25° C. of up to 70 kilocalories per gram atom of oxygen, and a solution metal having a relatively high negative free energy of oxide formation and exceeding that of the relatively noble matrix metal by at least about 60 kilocalories per gram atom of oxygen at 25° C. Suitable noble matrix metals include for example, iron, cobalt, nickel, copper, thallium, germanium, tin, lead, antimony, bismuth, molybdenum, tungsten, rhenium, indium, silver, gold, ruthenium, palladium, osmium, platinum, and rhodium. Suitable solute metals include for example, silicon, titanium, zirconium, aluminum, beryllium, thorium, chromium, magnesium, manganese. The alloy composition comprises between about 0.01% to about 3 weight percent of solute metal with the balance being relatively noble matrix metal and, if desired, minor amounts of conventional additives to improve abrasion resistance, hardness, conductivity, and other selected properties.

Molten metal alloy can be atomized by gas or liquid such as described in U.S. Pat. No. 2,956,304 wherein a plurality of liquid streams are directed from nozzles peripherally located about a middle stream of alloy metal to disintegrate the descending molten metal stream and form comminuted alloy powder. The atomized alloy particles often have a size distribution of particles including about 20% to 50% weight fraction of alloy particles greater than 180 microns. In accordance with a particular advantage of this invention, the atomization process can be adjusted so as to increase the fraction of particles above 180 microns which can now be efficiently utilized in accordance with this invention. Preferably, the particles greater than 180 microns are screened for example, by an 80 mesh U.S. screen to separate the larger particles from the finer particles. Usually the larger alloy particles do not extend beyond 1000 microns and are typically between 180 microns and 800 microns. The larger particles greater than 180 microns are then subjected to an impact or mechanical flaking step where the atomized particles are flattened to provide platelike or flaked alloy particles which are substantially planar flattened and having a flake thickness less than 180 microns and preferably a thickness between about 100 and 125 microns. The flaked alloy particles can be internally oxidized separately or preferably are intermixed with the smaller atomized particles, less than 180 microns, produced in the original atomization step. The mixture of atomized alloy particles and flaked alloy particles can contain by weight 20% to 80% and preferably 40% to 60% flaked alloy particles. Preferably, the atomized fraction has particles between about 37 microns and 180 microns.

The alloy flaked or mixture of alloy flaked and alloy atomized particles can be internally oxidized by conventional methods such as disclosed in prior art processes disclosed hereinbefore and identified as patents issued to Schreiner, McDonald, and Grant, and the same are included herein by reference. For example, the Schreiner patent, U.S. Pat. No. 3,488,183 provides a suitable method of internal oxidation of an alloy by controlling partial pressure of oxygen produced by dissociation of metal oxide within a two-compartment chamber. The McDonald patent, U.S. Pat. No. 3,552,954, provides internal oxidation of a copper alloy within an oxygen atmosphere to saturate the copper with oxygen and thereafter reducing with hydrogen. The Grant patent, U.S. Pat. No. 3,179,515, suggests internal oxidation by first oxidizing a copper alloy in air to form a surface layer of $Cu_2O$ followed by continued heating to diffuse oxygen into the copper matrix followed by hydrogen reduction.

A particularly preferred method of internally oxidizing is disclosed in said U.S. Pat. No. 3,779,714 which provides for an intimate admixture of alloy powder with oxidant. The disclosed oxidant comprises a pulverant, in situ heat-reducible metal oxide having a negative free energy of formation ranging up to 70 kilocalories per gram atom of oxygen at 25° C. in intimate interspersion with discrete particles of hard, refractory metal oxide, the negative free energy of formation of said hard, refractory metal oxide exceeding the negative free energy of formation of said heat-reducible metal oxide by at least 60 kilocalories per gram atom of oxygen at 25° C. Suitable heat-reducible metal oxides include for example, oxides of iron, cobalt, nickel, copper, thallium, germanium, tin, lead, antimony, bismuth, molybdenum, tungsten, rhenium, indium, silver, gold, ruthenium, palladium, osmium, platinum, and rhodium. Suitable hard, refractory metal oxides include, for example, oxides of silicon, titanium, zirconium, aluminum, beryllium, thorium, chromium, magnesium, manganese.

In any particular combination of the matrix metal and the solute metal in the alloy to be internally oxidized by the preferred method, the matrix metal must be relatively noble with respect to the solute metal so that the solute metal will be preferentially oxidized. This is achieved by selecting the solute metal such that its negative free energy of oxide formation at 25° C. is at least 60 kilocalories per gram atom of oxygen greater than the negative free energy of formation of the oxide of the matrix metal at 25° C. Generally, such solute metals have a negative free energy of oxide formation per gram atom of oxygen of over 80 kilocalories and preferably over 120 kilocalories. Similarly, the metal moiety of the heat-reducible metal oxide in the oxidant preferably is the same as matrix metal present in the alloy to be internally oxidized, although the heat-reducible metal oxide moiety can be different. Similarly, the hard, refractory metal oxide in the oxidant preferably is the same as the solute metal oxide formed in the alloy during internal oxidation of the alloy, although the refractory metal oxide in the oxidant can be different from the solute metal oxide in the internally oxidized alloy.

In preparing the alloy-oxidant mixture in accordance with the preferred method, at least about 0.1 weight parts of oxidant are combined with 100 weight parts of powder alloy and desirably between about 0.1 to 20 weight parts of oxidant. Preferably, about 0.1 to 10 weight parts of oxidant are combined with about 100 weight parts of powder alloy. The exact proportions of the oxidant relative to the alloy depends on the solute metal of the alloy to be oxidized, and the oxygen content of the oxidant. The amount of such oxidant to be added may be determined by the stoichiometric amount of oxygen required to completely oxidize the solute metal. In this regard, the heat-reducible metal oxide is added in sufficient amounts to completely oxidize the solute metal in the alloy, whereas the amount of hard refractory metal oxide depends upon the amount of heat-reducible metal oxide. The residue of heat-reducible metal oxide present after internal oxidation is dispersion strengthened by coalescence by the hard, refractory metal oxide. Sufficient oxidant is utilized to completely oxidize the solute metal in the alloy, however, if excessive oxidant is utilized, resulting internally oxidized metal powder may then be reduced with hydrogen at temperatures of about 1500° F. for time sufficient to reduce residual oxygen.

The following illustrative examples are included to further explain the invention and are not intended to be limiting.

EXAMPLE 1

(A). OFHC copper was alloyed with 0.6% by weight aluminum in accordance with the procedure set forth in Example 1 of U.S. Pat. No. 4,077,816 wherein molten copper-aluminum was superheated to about 1300° C. and then atomized through an atomizing aperature in a jet of nitrogen to yield an atomized copper-aluminum alloy powder which was then passed through an 80 mesh U.S. Sieve to screen particles less than 177 microns. At this point, the larger fraction with particles greater than 177 microns was then flaked in a rolling mill to provide flattened or flaked particles having a thickness between 100 and 125 micron thickness (flaked fraction). The atomized fraction was further screened to obtain a preferred atomized fraction between 37 and 177 microns. The fraction less than 177 microns and the fraction greater than 177 microns were maintained separate and each fraction was annealed at about 870° C. for about an hour in argon atmosphere to recrystallize and yield a grain size at least as large as ASTM No. 6 according to ASTM E-112.

(B). An oxidant was prepared by blending by weight about 99 parts of commercial cuprous oxide ($Cu_2O$) having an average particle size of about 1 to 2 microns with 1 part of 0.02 micron aluminum oxide ($Al_2O_3$) to form fine oxidant powder.

(C). Each fraction was then mixed with oxidant powder B in the weight proportion of 100 parts alloy powder and 6.05 parts oxidant.

(D). Each alloy powder-oxidant mixture was then charged to separate internal oxidation vessels and then heated to about 925° C. for about 60 minutes to internally oxidize each powder mixture. Substantially all of the solute metal aluminum was oxidized to $Al_2O_3$ and substantially all of the oxidant cuprous oxide was reduced to metallic copper. The internally oxidized alloy comprised 98.87% copper plus trace amounts of impurities and 1.13% $Al_2O_3$, and the oxidant residue comprised 98.87% copper particles and 1.13% $Al_2O_3$ particles. The overall composition was by weight 94.79% internally oxidized alloy powder and 5.21% oxidant residue.

(E). Each internally oxidized alloy mixture was reduced by hydrogen at a temperature of 800° C.–825° C. for about one hour to reduce any residual copper oxide.

(F). Each atomized fraction and flaked fraction mixture from E was filled into a thin walled copper can having a diameter of 6 inches and equipped with a feed tube. Each can and its contents were heated to about 870° C. and then the feed tube was sealed. Each sealed can was then placed in a ram-type extrusion press and extruded to form extrudate in the shape of cylindrical bar stock having a diameter of about 0.5 inches. The extrusion ratio corresponds to a 144:1 ratio of cross-sectional areas of can to extrudate.

(G). Two mixtures of atomized and flake internally oxidized alloy were tested as follows:

(i) 70% atomized + 30% flaked by weight
(ii) 60% atomized + 40% flaked by weight
(iii) 100% atomized as control As indicated, the foregoing were hot extruded into ½ inch diameter rods and tested at room temperature as well as 1550° F. (843° C.) stress rupture properties. The results are given in Table I.

TABLE I

Room temperature properties of extruded rod are as follows:

| Powder | Hardness $R_B$ | Tensile Strength | Elongation | Electrical Conductivity % IACS |
|---|---|---|---|---|
| (i) | 78 | 77,000 psi | 12% | 80 |
| (ii) | 78 | 78,000 psi | 12% | 80 |
| (iii) | 79 | 80,000 psi | 13% | 81 |

The 100-hour rupture strengths at 1550° F. were as follows:

(i) 8,200 psi
(ii) 8,400 psi
(iii) 7,600 psi

Both blends (i) and (ii) had comparable room temperature properties to (iii) but higher stress rupture strengths at 1550° F.

EXAMPLE 2

Several ½ inch rods from Example 1 were cold forged into resistance welding electrodes in accordance with the procedure set forth in U.S. Pat. No. 4,045,644 and then tested under the following welding conditions.

| Welding Test Conditions | | |
|---|---|---|
| Sheet Materials: | Top: | Bare SAE 1010 |
| | Bottom: | Galvanized SAE 1010 |
| Sheet Thickness: | Top: | 0.075 inch |
| | Bottom: | 0.080 inch |
| Weld Current: | | 13,000 amps |
| Weld Force: | | 1300 pounds |
| Weld Time: | | 16 cycles |
| Squeeze Time: | | 84 cycles |
| Hold Time: | | 100 cycles |
| Off Time: | | 100 cycles |
| Weld Rate: | | 12/minute |
| Cooling water: | | 1 gallon/minute/electrode |

The lengths and face diameters of the above electrodes were measured at the beginning of the test and subsequently at 2500 weld intervals. Length change is a measure of Wear and is related to electrode life. Face diameter change is a measure of mushrooming and follows the length change closely. Table II shows the length change or wear data for the upper electrodes as a function of number of welds. Upper electrodes were welding against the bare steel. Upper electrode $\Delta L$ is shown in $10^{-3}$ inches.

TABLE II

| | Wear ($\Delta L$) $10^{-3}$ inches | | |
|---|---|---|---|
| No. of Welds | (i) | (ii) | (iii) |
| 2500 | 2 | 3 | 7 |
| 5000 | 3 | 5 | 8 |
| 7500 | 5 | 6 | 10 |
| 10000 | 7 | 8 | 13 |
| 12500 | 11 | 9 | 15 |
| 15000 | 13 | 10 | 18 |

Both electrodes (i) and (ii) were superior to control electrode electrode (iii) in wear rate. Electrode (ii) with 40% flaked oversize had the lowest wear rate. This electrode had a wear of 0.010 inch after 15000 welds while it took half that number of welds to produce the same wear in electrode (iii). The total wear in electrode (ii) after 15000 welds was also about half that in electrode (iii). This is a significant improvement.

Table III shows the wear data for lower electrodes as a function of the number of welds. Lower electrodes were welding against galvanized steel although the test results were comparable. Lower electrode wear data is reported in $10^{-3}$ inches.

TABLE III

| | Wear (L) $10^{-3}$ inches | | |
|---|---|---|---|
| No. of Welds | (i) | (ii) | (iii) |
| 2500 | 11 | 15 | 17 |
| 5000 | 23 | 24 | 23 |
| 7500 | 27 | 22 | 31 |
| 10000 | 30 | 36 | 33 |
| 12500 | 33 | 40 | 39 |
| 15000 | 35 | 43 | 42 |

The foregoing examples indicate that the combination of flaked internally oxidized alloy in combination with atomized internally oxidized alloy provides an improvement in dispersion strengthened metal products. Improved properties include high temperature strength and improved electrode performance. Further advantages include improved yields and efficient use of larger atomized particles as well as the processing flexibility of increasing the average size of atomized particles as well as reducing the fraction considerably of extremely fine atomized particles below 20 microns. Still further advantages are achieved by efficient internal oxidation of large flaked atomized particles, redistribution and disruption of surface oxide layers formed during atomization. The foregoing examples are not intended to be limiting except by the appended claims.

I claim:

1. In a process for dispersion strengthening metal including the steps of providing atomized powdered metal alloy of a relatively noble matrix metal and a solute metal, the matrix metal having a relatively low negative free energy of oxide formation and the solute metal having a relatively high negative free energy of oxide formation, and the step of internally oxidizing said powdered alloy, the improvement comprising:

providing atomized alloy metal particles having a particle size up to about 1000 microns to provide a first fraction of alloy metal particles between about 37 and 180 microns and a second fraction of oversize alloy metal particles larger than about 180 microns;

separating the second fraction of oversize alloy metal particles from the first fraction of alloy metal particles;

flattening said oversize metal particles to provide flaked alloy metal particles having a flake thickness less than about 180 microns;

mixing said flaked alloy metal particles with at least a portion of said first fraction of atomized alloy metal particles to provide a powdered alloy metal mixture of the first fraction atomized alloy particles and flaked alloy metal particles, said mixture containing by weight between about 20% and 80% of said flaked alloy metal particles;

consolidating said internally oxidized alloy metal mixture to provide a dispersion strengthened metal product.

2. The process in claim 1 wherein the flake alloy metal particles have a thickness of between about 100 and 125 microns.

3. The process of claim 1 wherein the step of internal oxidation is after the step of mixing the flake alloy particles with the atomized alloy particles.

4. The process in claim 1 wherein the flaked alloy particles and the first fraction of atomized alloy particles are internally oxidized separately and then mixed to provide an internally oxidized mixture of flaked alloy particles and atomized alloy particles.

5. The process in claim 1 wherein the alloy metal is atomized to provide atomized alloy metal particles having a particle size substantially between about 37 microns and 1000 microns.

6. The process in claim 1 wherein said powdered alloy metal mixture is combined with 0.1 to 10 weight parts of oxidant per 100 weight parts of said alloy metal mixture prior to the step of internal oxidation.

7. The process in claim 6 wherein the oxidant contains a heat-reducible metal oxide and a hard-refractory metal oxide.

8. The process in claim 1 wherein the dispersion strengthened product is a welding electrode.

9. The process in claim 6 wherein the welding electrode is a resistance welding electrode rod.

10. The process for dispersion strengthening metal including the steps of providing atomized powdered metal alloy of a relatively noble matrix metal and a solute metal, the matrix metal having a negative free energy of oxide formation at 25° C. of up to 70 kilocalories per gram atom of oxygen, said solute metal having a negative free energy of oxide formation exceeding the negative free energy of oxide formation of said matrix metal by at least about 60 kilocalories per gram atom of oxygen at 25° C., the improvement comprising:

providing alloy metal particles having a particle size up to about 1000 microns to provide a first fraction of alloy metal particles less than about 180 microns and a second fraction of oversize alloy metal particles larger than about 180 microns;

separating the second fraction of oversize alloy metal particles from the first fraction of alloy metal particles;

flattening said oversize metal particles to provide flaked alloy metal particles having a flake thickness less than about 180 microns; and mixing said flaked alloy metal particles with at least a portion of said first fraction of alloy metal particles to provide a powdered alloy metal mixture of the first fraction atomized alloy particles and flaked alloy metal particles, said mixture containing between about 20% and 80% by weight of said flaked alloy metal particles adapted to be dispersion strengthened.

* * * * *